United States Patent
Li et al.

(10) Patent No.: US 9,207,497 B2
(45) Date of Patent: *Dec. 8, 2015

(54) METHOD FOR PREPARING ALIGNMENT FILM, METHOD FOR IMPLEMENTING ORIENTATION, AND LIQUID CRYSTAL DISPLAY DEVICE

(71) Applicant: BEIJING BOE OPTOELECTRONICS TECHNOLOGY CO., LTD., Beijing (CN)

(72) Inventors: Wei Li, Beijing (CN); Ang Xiao, Beijing (CN); Hongliang Yuan, Beijing (CN); Kaixuan Wang, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/123,339

(22) PCT Filed: Nov. 28, 2012

(86) PCT No.: PCT/CN2012/085479
§ 371 (c)(1),
(2) Date: Dec. 2, 2013

(87) PCT Pub. No.: WO2014/019304
PCT Pub. Date: Feb. 6, 2014

(65) Prior Publication Data
US 2014/0313464 A1  Oct. 23, 2014

(30) Foreign Application Priority Data
Jul. 30, 2012 (CN) .......................... 2012 1 0269174

(51) Int. Cl.
*G02F 1/1337* (2006.01)

(52) U.S. Cl.
CPC ............... *G02F 1/133788* (2013.01); *G02F 2001/133757* (2013.01)

(58) Field of Classification Search
CPC .............. G02F 1/133788; G02F 2001/133757
USPC ................... 430/321, 394, 396; 349/124
See application file for complete search history.

(56) References Cited

U.S. PATENT DOCUMENTS

| 5,608,033 A | 3/1997 | Nihira et al. |
| 2006/0061719 A1* | 3/2006 | Tomioka et al. ............ 349/123 |

(Continued)

FOREIGN PATENT DOCUMENTS

| CN | 1100110 C | 2/1996 |
| CN | 1116230 A | 2/1996 |

(Continued)

OTHER PUBLICATIONS

Restriction Requirement in related U.S. Appl. No. 13/703,668 dated Jul. 10, 2014; 6 pages.

(Continued)

*Primary Examiner* — John A McPherson (57) ABSTRACT

A method for preparing an alignment film (6), a method for performing alignment of the alignment film (6), as well as a multi-dimensional liquid crystal display device manufacture using the alignment film (6). The alignment film (6) generated by the preparation method is a light sensitive alignment film (6), which can generate directions of orientation perpendicular or parallel to the polarization direction under different dosages of linearly polarized ultraviolet light (10). By adjusting the polarization direction or dosage of the linearly polarized ultraviolet light (10), multi-dimensional orientations of the alignment film (6) is achieved. Manufacture of a multi-dimensional liquid crystal display device using a substrate (1) having the alignment film (6) with multi-dimensional orientations avoids the manufacture of the multi-dimensional electrode, and reduces costs and difficulty of process.

13 Claims, 3 Drawing Sheets

(56) References Cited

U.S. PATENT DOCUMENTS

2007/0128378 A1    6/2007  Kim et al.
2013/0150523 A1*   6/2013  Xiao et al. .................... 524/600

FOREIGN PATENT DOCUMENTS

| CN | 101321845 | A |   | 12/2008 |
|----|-----------|---|---|---------|
| CN | 101397287 | A |   | 4/2009  |
| CN | 102707496 | A | * | 10/2012 |
| JP | 03-077844 | A |   | 4/1991  |
| JP | 2002-003454 | A |   | 1/2002 |
| JP | 4168593   | B2 |  | 10/2008 |
| JP | 2008-266262 | A |   | 11/2008 |

OTHER PUBLICATIONS

Office Action in related U.S. Appl. No. 13/703,668 dated Sep. 2, 2014, and Forms PTO-1449; 11 pages.
International Search Report (Chinese language), in PCT Application No. PCT/CN2012/081159; 13 pages. Dec. 2012.
International Preliminary Report on Patentability (English language), in PCT Application No. PCT/CN2012/081159; dated Mar. 12, 2014; 9 pages.
First Office Action (Chinese language) issued by the State Intellectual Property Office of People's Republic of China, in Chinese application No. 201110266038.X, dated May 5, 2014, 5 pages.
English translation of First Office Action issued by the State Intellectual Property Office of People's Republic of China, in Chinese application No. 201110266038.X, dated May 5, 2014, 2 pages.
International Preliminary Report on Patentability (English language), in PCT Application No. PCT/CN2012/085479; dated Feb. 3, 2015; 6 pages.
English abstract of CN1100110C (cited above) Feb. 1996.
English abstract of CN1116230A (cited above) Feb. 1996.
English abstract of CN101321845A (cited above) Dec. 2008.
English abstract of CN101397287A (cited above) Apr. 2009.
English abstract of JP03-077844A (cited above) Apr. 1991.
English abstract of JP2002-003454A (cited above) Jan. 2002.
English translation of JP4168593B2 (cited above) Oct. 2008.
English translation of JP2008-266262A (cited above) Nov. 2008.

* cited by examiner

METHOD FOR PREPARING ALIGNMENT FILM, METHOD FOR IMPLEMENTING ORIENTATION, AND LIQUID CRYSTAL DISPLAY DEVICE

CROSS REFERENCE TO RELATED APPLICATIONS

This application is based on International Application No. PCT/CN2012/085479 filed on Nov. 28, 2012, which claims priority to Chinese National Application No. 201210269174.9 filed on Jul. 30, 2012, the contents of which are incorporated herein by reference.

TECHNICAL FIELD

The embodiments of the invention relates to a method for preparing an alignment film, a method for performing alignment, and a liquid crystal display device.

BACKGROUND

With the continuous progress of science and technology, liquid crystal display is having wider and wider applications. In order to achieve the liquid crystal display, the liquid crystal molecules in the liquid crystal display device are required to alignment orderly in a certain manner, and the device needs certain contrast and black level. For example, FIG. 1 is a schematic diagram showing the display mechanism of a thin film transistor liquid crystal display (TFT-LCD) with the fringe field switching (FFS) technique in the state of art.

Figure 1:
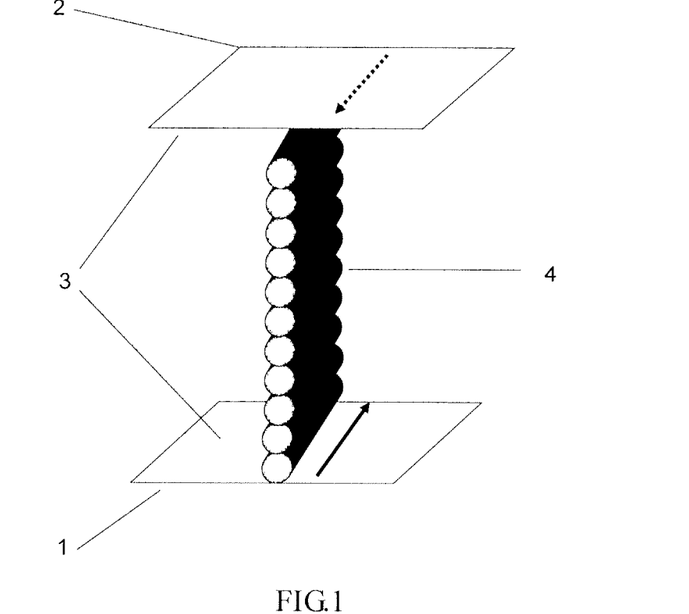
FIG. 1 is a schematic diagram of the liquid crystal display in liquid crystal display device of the state of art.

In FIG. 1, polyimide alignment films 3 are coated on the internal surfaces of the TFT array substrate 1 and color filter substrate 2. The polyimide alignment films 3 are subjected to rubbing to form troughs along a certain direction. The polyimide alignment films 3 can achieve a uniform orientation of the liquid crystal molecules on the surfaces of the films 3 through the anistrophic interactions among the molecules. In order to confer anistrophy on the molecules in the alignment films 3, the alignment films 3 are subjected to a rubbing process, in which the direction of the rubbing is along the initial orientations on the alignment film 3, and the initial orientations on the films 3 on the upper and lower substrates are antiparallel, as indicated by the arrows in FIG. 1.

Further, in FIG. 1, polarizers (not shown) with absorption axes orthogonal to each other are disposed on the backside of the substrates 1 and 2 (external sides of the liquid crystal panel). Where there is no externally applied electric field, the light enters the liquid crystal cell from the array substrate 1 via the polarizer. Because the light is not deflected by the liquid crystal molecules 4, it cannot be transmitted through the polarizer on the backside of the color filter substrate 2, rendering the liquid crystal display device in the normal black mode.

Figure 2:
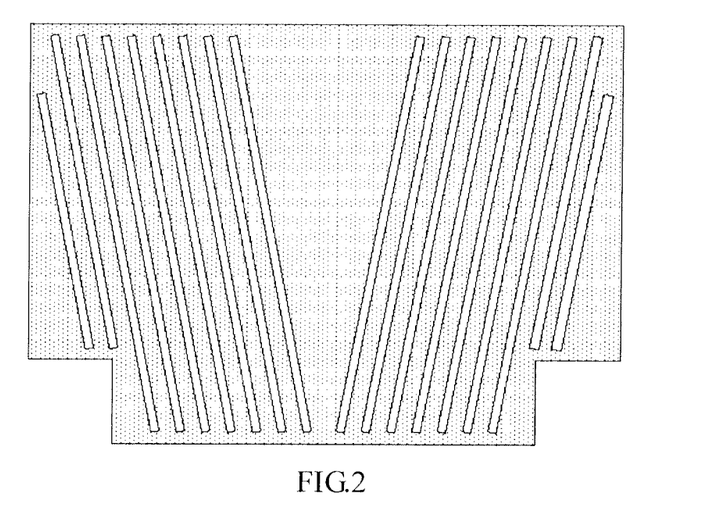
FIG. 2 is a schematic diagram of the design of the pixel electrode in the state of art.

In order to further increase visual angles and contrast of a liquid crystal display, decrease the black level of the liquid crystal display, and allow the liquid crystal displays have wider visual angle, the black level of the HS type TFT-LCD without externally applied electric fields is usually lowered by constructing multi-dimensional pixel electrodes. FIG. 2 is a schematic diagram of the design of the pixel electrode in the state of art. However, in the state of art, usually the multi-dimensional construction of the electrode is achieved by film etching technique and a corresponding mask plate needs to be made.

In summary, in order to achieve the multi-dimensional display of the liquid crystal display, the current multi-dimensional thin film transistor liquid crystal display device needs a complicated manufacturing process, incurs high cost, and is difficult to manufacture.

SUMMARY

The embodiments of the invention provides a method for preparing an alignment film, a method for performing alignment and multi-dimensional orientations of the alignment film, and a multi-dimensional liquid crystal display device, for solving the issues in relation to the multi-dimensional liquid crystal display device in the state of art which has complicated manufacturing process, high costs, and is difficult to manufacture.

In one aspect, the invention provides a method for preparing an alignment film comprising:

mixing 4-nitrobenzyl bromide with triphenylphosphine at a molar ratio of 1:0.95~1:1, dissolving them in a dry tetrahydrofuran solution, heating and agitating under reflux, to obtain a dry white product A;

mixing the resultant white product A with p-nitrobenzaldehyde at a molar ratio of 0.95:1~1:1 in a tetrahydrofuran solution, and agitating under room temperature to obtain a product B;

mixing the resultant product B with tin dichloride at a molar ratio of 1:1~1:1.5, then dissolving them in a mixed solution of hydrochloride acid and acetone, and agitating them under the room temperature and refluxing to obtain a product C;

mixing the resultant product C with 9,9'-bianthracyl tetracarboxylic dianhydride in a dry N-methyl-pyrrolidone solution under agitation to obtain a product D; and heating the resultant product D to obtain the alignment film.

In another aspect, the invention provides a method for performing alignment of the aforesaid alignment film comprising illuminating the alignment film with linearly polarized ultraviolet light at different dosages so that the alignment film is made to orient along the directions according to the corresponding dosages.

As to this method, for example, when the dosage is 500±5 mJ/cm², the alignment film is oriented along the direction perpendicular to the polarization direction of the linearly polarized ultraviolet light and has the highest homogeneity.

As to this method, for example, when the dosage is 2000±5 mJ/cm², the alignment film is oriented along the direction parallel to the polarization direction of the linearly polarized ultraviolet light and has the highest homogeneity.

In yet another aspect, the invention further provides a method for implementing multi-dimensional orientations of the alignment film comprising:

coating the alignment film on a substrate, and predetermining regions corresponding to each orientation among the multi-dimensional orientations of the alignment film;

covering the alignment film with an ultraviolet light mask plate having ultraviolet light transmission regions, and covering regions corresponding to each orientation with the ultraviolet light transmission regions of the ultraviolet mask plate in sequence; and illuminating the ultraviolet mask plate with linearly polarized ultraviolet light at a dosage that makes the alignment film orient along the direction perpendicular or parallel to the polarization direction of the linearly polarized ultraviolet light and have the highest homogeneity, such that each orientation along the direction corresponding to the dosage and the polarization direction of the linearly polarized ultraviolet light is generated within the regions corresponding to each orientation.

As to this method, for example, the method for using linearly polarized ultraviolet light to illuminate the ultraviolet light mask plate comprises: illuminating the mask plate while maintaining the polarization direction but changing the dosage of the linearly polarized ultraviolet light; or illuminating the mask plate while maintaining the dosage but changing the polarization direction of the linearly polarized ultraviolet light.

The invention further provides an array substrate comprising an alignment film having the multi-dimensional orientations as generated using the aforesaid methods.

In yet another aspect, the invention further provides a color filter substrate comprising an alignment film having the multi-dimensional orientations as generated using the aforesaid methods.

In yet another aspect, the invention further provides a liquid crystal display device comprising the aforesaid array substrate and the aforesaid color filter substrate aligned against each other and having liquid crystals disposed between the array substrate and the color filter substrate.

The alignment film generated using the preparation method of the embodiments of the invention can be oriented differently under the illumination of linearly polarized ultraviolet light, and this alignment film can generate orientation direction perpendicular or parallel to the polarization direction under different dosages of the linearly polarized ultraviolet light. By adjusting the polarization direction or dosage of the linearly polarized ultraviolet light, multi-dimensional orientations of different regions on the same substrate can be achieved. Moreover, compared to the state of art multi-dimensional electrode technique, manufacture of a multi-dimensional liquid crystal display device using a substrate having the alignment film with the multi-dimensional orientations avoids the manufacture of the multi-dimensional electrode, and reduces costs and difficulty of process.

BRIEF DESCRIPTION OF THE DRAWINGS

In order to more clearly illustrate the embodiments of the invention, the figures of the embodiments are briefly introduced below. It is apparent that the figures below merely relate to some embodiments of the invention, rather than limit the scope of the invention.

DETAILED DESCRIPTION

In order to make the object, technical solutions and advantages of the embodiments of the invention more clear, the technical solutions of the embodiments of the invention are described in a clear and complete manner below in relation to figures of the invention. It is apparent that the embodiments describes are merely some, rather than all embodiments of the invention. All other embodiments that can be obtained by a person of ordinary skill in the art on the basis of the described embodiments of the invention and without resorting to inventive work fall within the scope of the invention.

Unless otherwise defined, the technical or scientific terms used herein should have the ordinary meaning understood by a person of ordinary skill in the relevant art of the invention. "A" or "an" or similar terms do not imply limitation on number, but rather indicate the existence of at least one. "Comprises" or "includes" or similar terms mean that the element or object appearing before the "comprises" or "includes" encompasses the element or object or equivalents thereof enumerated after the "comprises" or "includes", but does not exclude other elements or objects. "Connected" or "joined" or similar terms are not limited to physical or mechanical connection, but encompass electric connection, no matter it is directly or indirectly. "Upper", "lower", "left" and "right" merely indicate relative positions. If the absolute position of the object described is changed, the relative positions may also change accordingly.

An embodiment of the invention provides a method for preparing an alignment film, and in implementing the multi-dimensional orientations of liquid crystals with the alignment film, the alignment film can generate stronger $\pi$-$\pi$ interaction with the liquid crystal molecules which favors the generation of stronger anchorage of the liquid crystal molecules with the alignment film.

Embodiment 1 of the invention provides a method for preparing an alignment film comprising the following steps of:

mixing 4-nitrobenzyl bromide with triphenylphosphine at a molar ratio of 1:0.95~1:1, dissolving the mixture in a dry tetrahydrofuran solution, for example, heating to 75° C. and agitating under reflux for 48 hours, to obtain a dry white product A;

mixing the resultant white product A with p-nitrobenzaldehyde at a molar ratio of 0.95:1~1:1 in a 150 ml tetrahydrofuran solution, and, for example, agitating under room temperature for about 24 hours to obtain a product B;

mixing the resultant product B with tin dichloride at a molar ratio of 1:1~1:1.5, and then dissolving the mixture in a mixed solution of hydrochloride acid and acetone, for example, agitating under the room temperature for about 2 hours and refluxing for 8 hours to obtain a product C, wherein the mass percentage concentration of hydrochloric acid can be 30%;

mixing the resultant product C with 9,9'-bianthracyl tetracarboxylic dianhydride in a dry N-methyl-pyrrolidone solution under agitation for, for example, 24 hours, under the protection of a inert gas such as nitrogen, to obtain a product D; and heating the resultant product D to, for example, 230° C., to obtain the alignment film.

The example is not limited to the specific parameters such as ratio, time and temperature, etc. in the various steps above. Rather, the parameters can be adjusted according to practical needs. 4-nitrobenzyl bromide, triphenylphosphine, p-nitrobenzaldehyde as well as 9,9'-bianthracyl tetracarboxylic dianhydride and the like can be commercial available products or synthesized using known methods.

Figure 3:
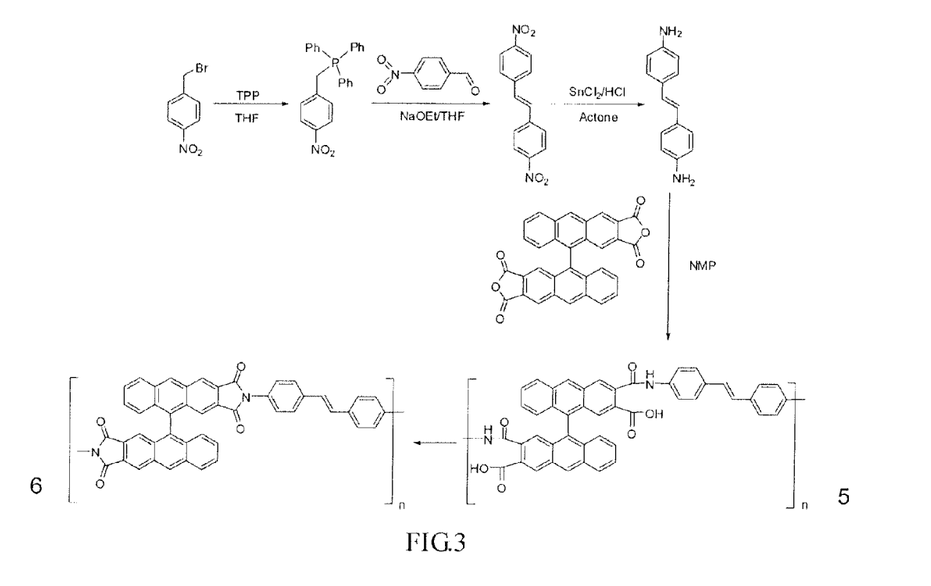
FIG. 3 is a schematic diagram of the structure and synthetic scheme of the alignment film polymer involved in an embodiment of the invention.

Preferably, the structure and the synthetic scheme of the alignment film polymer involved in the invention are shown in FIG. 3.

In an embodiment of the invention, a method for preparing the aforesaid alignment film in a laboratory level is illustrated as an example. 10 g of 4-nitrobenzyl bromide is mixed with 12 g of triphenylphosphine and dissolved in 150 ml of a dry tetrahydrofuran solution, heated to 75° C. and agitated under reflux for 48 hours, to obtain 8.2 g of a dry white p-nitrobenzyl triphenylphosphine. The p-nitrobenzyl triphenylphosphine is mixed with 2.6 g of p-nitrobenzaldehyde in a 150 ml tetrahydrofuran solution, and agitated under room temperature for about 24 hours to obtain 4.2 g of p-nitrostilbene. The resultant p-nitrostilbene is mixed with 14.7 g of tin dichloride, dissolved in a mixed solution of 30 ml/40% hydrochloride acid and 100 ml acetone, agitated under the room temperature for about 2 hours and refluxed for 8 hours to obtain p-aminostilbene. The p-aminostilbene is mixed with 9,9'-bianthracyl tetracarboxylic dianhydride in a dry NMP (N-methylpyrrolidone) solution under agitation for 24 hours, under protection of nitrogen gas, to obtain the precursor of the polyimide alignment film involved in the embodiment. The precursor is heated to 230° C. to obtain the final alignment film, which is a light sensitive alignment film.

In the aforesaid method for preparing the alignment film according to the embodiment of the invention, 9,9'-bianthracyl tetracarboxylic dianhydride is used as the prepolymer, and compared to pyromellitic dianhydride used in the conventional preparation method, it has the following advantages: it contains an aromatic ring of a larger volume which can generate stronger π-π interaction with liquid crystal molecules when using the alignment film to achieve the multi-dimensional orientations of liquid crystals, which favors the generation of stronger anchorage of the liquid crystal molecules by the alignment film.

The alignment film obtained by the preparation method of embodiment 1 of the invention is light sensitive and can perform different orientations under different dosages of ultraviolet light illumination. Embodiment 2 of the invention provides a method for performing alignment of the aforesaid alignment film.

In the embodiment of the invention, the alignment film is illuminated with different dosages of linearly polarized ultraviolet light so that the alignment film is made to orient along the directions according to the corresponding dosages. The alignment film will be made to orient homogeneously under the illumination of a certain dosage of the linearly polarized ultraviolet light, and under a different dosage, the orientation direction and homogeneity will also differ.

Preferably, for example, when the dosage of the linearly polarized ultraviolet light is within 500±5 mJ/cm$^2$, the alignment film is oriented along the direction perpendicular to the polarization direction of the linearly polarized ultraviolet light and has the highest homogeneity. For example, when the dosage is within 2000±5 mJ/cm$^2$, the alignment film is oriented along the direction parallel to the polarization direction of the ultraviolet light and has the highest homogeneity.

In the embodiment of the invention, linearly polarized ultraviolet light is used to illuminate a light sensitive alignment film to make it generate different orientations. Moreover, under a certain dosage, orientation along the direction perpendicular or parallel to the polarization direction can be generated, i.e., two orientations orthogonal to each other can be generated for the light sensitive alignment film. This property of the light sensitive alignment film can be employed in the process for realizing multi-dimensional orientations of the alignment film which makes the liquid crystals to take multi-dimensional orientation, thereby resulting in different orientations of various regions of the alignment film on the same substrate.

Embodiment 3 of the invention provides a method for implementing multi-dimensional orientations of a light sensitive alignment film comprising the following steps.

Step S401: coating the alignment film obtained in the preparation method of Embodiment 1 on the substrate.

Step S402: predetermining the region corresponding to each orientation among the multi-dimensional orientations of the alignment film on the substrate.

Preferably, for example, the regions determined to have the multi-dimensional orientations of the alignment film can be in any shape determined according to practical needs. Moreover, the regions corresponding to different orientations may be the same as each other or different from each other. However, because the alignment film is to achieve multi-dimensional orientations, the determined regions corresponding to different orientations should be at least two regions which do not overlap with each other. Moreover, the number of regions according to each orientation is not limited to one, and more such regions can be determined.

Step S403: covering the alignment film with an ultraviolet light mask plate having an ultraviolet light transmission region, and covering the region corresponding to each orientations with the ultraviolet light transmission region of the ultraviolet mask plate in sequence.

Preferably, for example, when covering each region corresponding to each orientation with the ultraviolet light transmission region of the ultraviolet mask plate, the ultraviolet light transmission region of the ultraviolet mask plate can be disposed according to the shape and number of the region corresponding to each orientation on the substrate with some flexibility. For example, when the regions corresponding to different orientations have the same shape and are symmetric to each other, the ultraviolet light transmission regions can be directly disposed by translating the ultraviolet mask plate to change the position of the ultraviolet light transmission region and the ultraviolet light absorption region of the ultraviolet mask plate without the need to dispose the ultraviolet mask plate again.

Preferably, the number of the ultraviolet mask plates can be determined according to practical needs, for example, one or more.

Step S404: illuminating each ultraviolet mask plate with linearly polarized ultraviolet light at a dosage that makes the alignment film orient along the direction perpendicular or parallel to the polarization direction of the linearly polarized ultraviolet light and have the highest homogeneity in sequence, such that each orientation along the direction corresponding to the dosage and the polarization direction of the linearly polarized ultraviolet light is generated within the regions corresponding to the orientation.

For example, when the alignment film is oriented along the direction perpendicular to the polarization direction of the linearly polarized ultraviolet light and has the highest homogeneity, the dosage of the linearly polarized ultraviolet light is 500±5 mJ/cm$^2$. For example, when the alignment film is oriented along the direction parallel to the polarization direction of the ultraviolet light and has the highest homogeneity, the dosage of the linearly polarized ultraviolet light is 2000±5 mJ/cm$^2$.

Preferably, for example, when the method for illuminating the ultraviolet light mask plate with linearly polarized ultraviolet light is used to generate an orientation along a different direction in each orientation region of the alignment film on the substrate, the following methods of illumination can be used: illuminating each mask plate while maintaining the polarization direction of the linearly polarized ultraviolet light, but changing the dosage of the linearly polarized ultraviolet light; or illuminating each mask plate while maintaining the dosage of the linearly polarized ultraviolet light, but changing the polarization direction of the linearly polarized ultraviolet light.

The method for implementing multi-dimensional orientations of the light sensitive alignment film according to the embodiment of the invention can achieve the multi-dimensional orientations in different regions of the alignment film on the same substrate by adjusting the polarization direction or dosage of the linearly polarized ultraviolet light, and compared to the state of art method for generating multi-dimensional orientations of the alignment film molecules by rubbing process, the method is easier to carry out and the complexity of the process is reduced.

Embodiment 4 of the invention is a preferable, rather than limiting, example of the method for implementing the multi-dimensional orientations of the alignment film of embodiment 3. In this example, one ultraviolet light mask plate with ultraviolet light transmission regions disposed therein is used. The regions on the substrate corresponding to the predetermined alignment film are various belt-like regions which do not overlap with one another. Moreover, the orientation directions of the alignment film in adjacent belt-like regions are orthogonal to each other.

Figure 4:
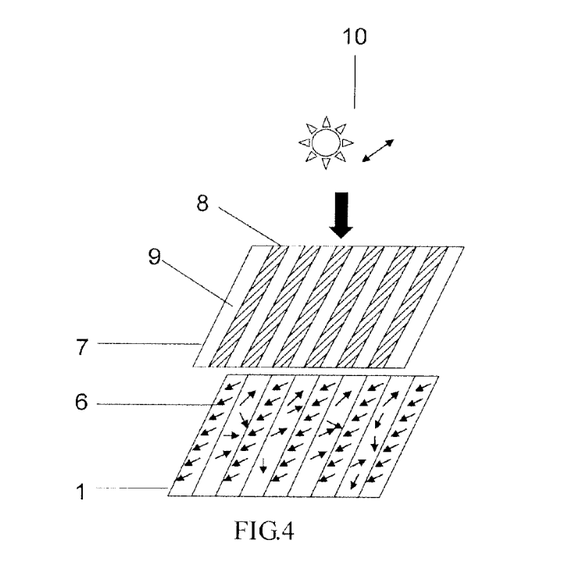
FIG. 4 is a schematic diagram of the generation of an orientation direction parallel to the polarization direction by the light sensitive alignment film in an embodiment of the invention.

An ultraviolet mask plate 7 is covered on a substrate 1 coated thereon with the light sensitive alignment film 6 prepared in embodiment 1 of the invention. Ultraviolet absorption regions 8 and ultraviolet transmission regions 9 are provided on the ultraviolet mask plate 7 in an alternate arrangement, with the widths of various belt-like regions being identical.

The ultraviolet mask plate 7 is illuminated with linearly polarized ultraviolet light 10 at a dosage that makes the alignment film to orient along a direction parallel to the polarization direction of the linearly polarized ultraviolet light and have the highest homogeneity (for example, the dosage is 2000±5 mJ/cm$^2$), such that the alignment film 6 had a first orientation direction within the regions corresponding to the ultraviolet transmission regions 9 which are parallel to the current polarization direction, while the alignment film still had disordered orientations within the regions corresponding to the ultraviolet absorption regions 8, as shown in FIG. 4.

The ultraviolet mask plate 7 is translated for the determined width, such that the positions of the ultraviolet absorption regions 8 and the ultraviolet transmission regions 9 are exchanged to the light source.

Figure 5:
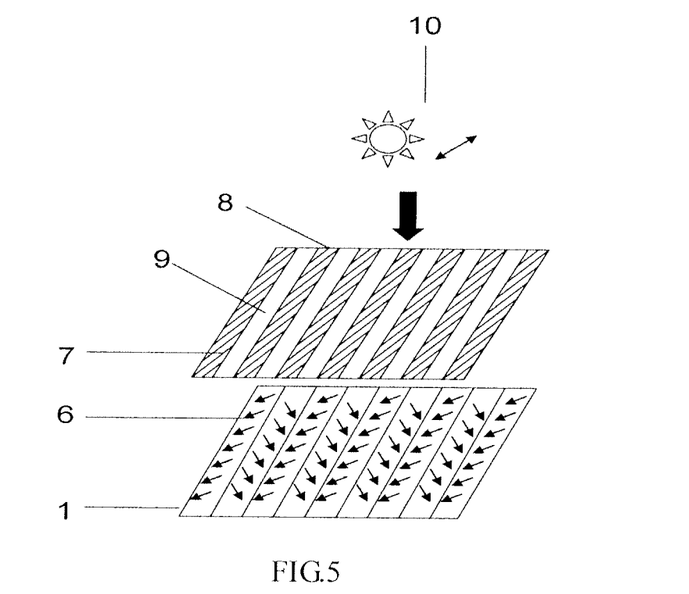
FIG. 5 is a schematic diagram of the generation of an orientation direction perpendicular to the polarization direction by the light sensitive alignment film in an embodiment of the invention.

The translated ultraviolet mask plate 7 is illuminated with the linearly polarized ultraviolet light 10 having the same polarization direction at a dosage that makes the alignment film to orient along a direction perpendicular to the polarization direction of the linearly polarized ultraviolet light and have the highest homogeneity (for example, the dosage is 500±5 mJ/cm$^2$), such that the alignment film 6 had a second orientation direction within the regions corresponding to the ultraviolet transmission regions, for example, the second orientation direction is orthogonal to the first orientation direction in adjacent belt-like regions, as shown in FIG. 5.

In the invention, orientation directions orthogonal to each other are generated in adjacent belt-like regions of the alignment film by maintaining the polarization direction but changing the dosage of the linearly polarized ultraviolet light. Moreover, when illuminating the ultraviolet light mask plate, the order of the orientations parallel to and the perpendicular to the polarization direction generated in adjacent belt-like regions of the alignment film does not matter.

When the number of the ultraviolet light mask plate is one, the regions having multi-dimensional orientations of the alignment film are at least two belt-like regions, and the two orientation directions of the alignment film in the adjacent belt-like regions are orthogonal to each other, the following method may also be employed: at least two belt-like regions are provided on the ultraviolet light mask plate with a determined width, and the belt-like regions are disposed as ultraviolet absorption regions and ultraviolet transmission regions in an alternate arrangement.

The ultraviolet mask plate is illuminated with the linearly polarized ultraviolet light of the first polarization direction with a dosage that makes the alignment film to orient along a direction parallel or perpendicular to the polarization direction of the linearly polarized ultraviolet light and have the highest homogeneity, such that the alignment film had a third orientation direction within the regions corresponding to the ultraviolet transmission regions.

The ultraviolet mask plate is translated for the determined width, such that the positions of the ultraviolet absorption regions and the ultraviolet transmission regions are exchanged.

The translated ultraviolet mask plate is illuminated with the linearly polarized ultraviolet light of the second polarization direction which is perpendicular to the first polarization direction with the same dosage to obtain a fourth orientation direction.

For example, the third orientation direction and the fourth orientation direction are orthogonal to each other in adjacent belt-like regions.

In the embodiment of the invention, the orthogonal orientations of the alignment film in adjacent regions on the substrate can be achieved by translating the ultraviolet mask plate with the ultraviolet light transmission regions disposed thereon and changing the polarization direction or dosage of the linearly polarized ultraviolet light, and the multi-dimensional orientations of liquid crystals can be achieved using the alignment film, which avoids the complicated manufacture process for electrodes and also avoids the complicated process of the manufacture of the mask plate so the method has low costs and reduced difficulty of process.

An embodiment of the invention further provides an array substrate comprising the alignment film having the multi-dimensional orientations generated in embodiment 4.

An embodiment of the invention further provides a color filter substrate comprising the alignment film having the multi-dimensional orientations generated with the aforesaid method.

The invention further provides a liquid crystal display device comprising the aforesaid array substrate having the multi-dimensional orientations and the aforesaid color filter substrate having the multi-dimensional orientations, and the array substrate and the color substrate are assembled together opposite to each other, and liquid crystals are disposed between the array substrate and the color filter substrate.

Figure 6:
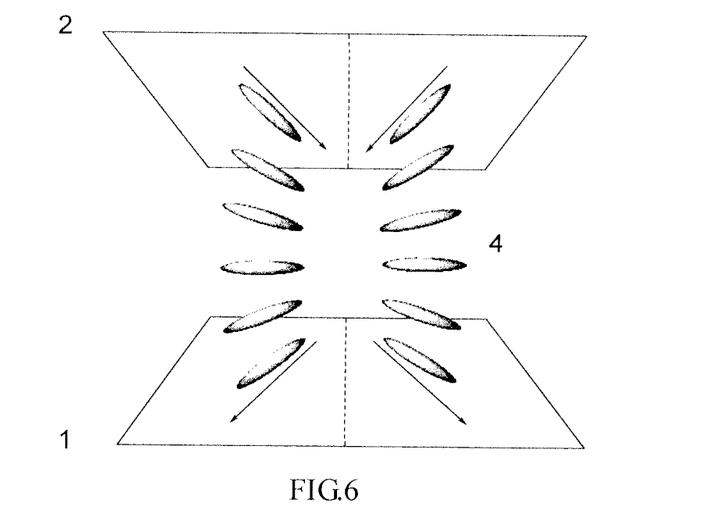
FIG. 6 is a schematic diagram of the thin film transistor liquid crystal display device with multi-dimensional orientations of the liquid crystal in an embodiment of the invention.

FIG. 6 is a schematic diagram of the thin film transistor liquid crystal display device with multi-dimensional orientations of the liquid crystal in an embodiment of the invention.

The liquid crystal display device provided by the embodiment of the invention does not require the complicated manufacture process for multi-dimensional electrodes and has a simple process of manufacture, and moreover, can realize multi-dimensional orientations of liquid crystals, which eliminates the issues of uneven black levels at different angles and increases the contrast of the display.

The aforesaid are just exemplary embodiments of the invention, rather than limit the scope of the invention which is determined by the appended claims.

The invention claimed is:

1. A method for preparing an alignment film comprising:
    mixing 4-nitrobenzyl bromide with triphenylphosphine at a molar ratio of 1:0.95~1:1, dissolving them in a dry tetrahydrofuran solution, heating and agitating under reflux, to obtain a dry white product A;
    mixing the resultant white product A with p-nitrobenzaldehyde at a molar ratio of 0.95:1~1:1 in a tetrahydrofuran solution, and agitating under room temperature to obtain a product B;
    mixing the resultant product B with tin dichloride at a molar ratio of 1:1~1:1.5, then dissolving them in a mixed solution of hydrochloride acid and acetone, agitating under the room temperature and refluxing to obtain a product C;
    mixing the resultant product C with 9,9'-bianthracyl tetracarboxylic dianhydride in a dry N-methyl-pyrrolidone solution under agitation to obtain a product D; and
    heating the resultant product D to obtain the alignment film.

2. A method for performing alignment of the alignment film according to claim 1 comprising illuminating the alignment film with linearly polarized ultraviolet light at different dosages so that the alignment film is made to orient along the directions according to the corresponding dosages.

3. The method for performing alignment of the alignment film according to claim 2, wherein when the dosage is 500±5 mJ/cm$^2$, the alignment film is oriented along the direction perpendicular to the polarization direction of the linearly polarized ultraviolet light and has the highest homogeneity.

4. The method for performing alignment of the alignment film according to claim 2, wherein when the dosage is 2000±5 mJ/cm$^2$, the alignment film is oriented along the direction parallel to the polarization direction of the linearly polarized ultraviolet light and has the highest homogeneity.

5. A method for implementing multi-dimensional orientations of the alignment film according to claim 1 comprising:
    coating the alignment film on a substrate, and predetermining regions corresponding to each orientation among the multi-dimensional orientations of the alignment film;
    covering the alignment film with an ultraviolet light mask plate having ultraviolet light transmission regions, and covering regions corresponding to each orientation with the ultraviolet light transmission regions of the ultraviolet mask plate in sequence; and
    illuminating the ultraviolet mask plate with linearly polarized ultraviolet light at a dosage that makes the alignment film orient along the direction perpendicular or parallel to the polarization direction of the linearly polarized ultraviolet light and have the highest homogeneity, such that each orientation along the direction corresponding to the dosage and the polarization direction of the linearly polarized ultraviolet light is generated within the regions corresponding to each orientation.

6. The method for implementing the multi-dimensional orientations of the alignment film according to claim 5, wherein the method for using linearly polarized ultraviolet light to illuminate the ultraviolet light mask plate comprises:
    illuminating the mask plate while maintaining the polarization direction but changing the dosage of the linearly polarized ultraviolet light; or
    illuminating the mask plate while maintaining the dosage but changing the polarization direction of the linearly polarized ultraviolet light.

7. The method for implementing the multi-dimensional orientations of the alignment film according to claim 6, wherein the regions having multi-dimensional orientations of the alignment film are at least two regions of any shape which do not overlap with each other.

8. The method for implementing the multi-dimensional orientations of the alignment film according to claim 7, wherein when the regions corresponding to different orientations have a same shape and are symmetric to each other, the ultraviolet light transmission regions are disposed by translating the ultraviolet mask plate.

9. The method for implementing the multi-dimensional orientations of the alignment film according to claim 8, wherein there are at least one ultraviolet mask plate.

10. The method for implementing the multi-dimensional orientations of the alignment film according to claim 9, wherein when there is one ultraviolet light mask plate, the regions having multi-dimensional orientations of the alignment film are at least two belt-like regions, and two orientation directions of the alignment film in adjacent belt-like regions are orthogonal to each other, the method comprises:
    providing at least two belt-like regions on the ultraviolet light mask plate with a determined width, and disposing the belt-like regions as ultraviolet absorption regions and ultraviolet transmission regions in an alternate arrangement;
    illustrating the ultraviolet mask plate with the linearly polarized ultraviolet light with a dosage that makes the alignment film to orient along a direction parallel to the polarization direction of the linearly polarized ultraviolet light and have the highest homogeneity, such that the alignment film has a first orientation direction within the regions corresponding to the ultraviolet transmission regions;
    translating the ultraviolet mask plate for the determined width, such that the positions of the ultraviolet absorption regions and the ultraviolet transmission regions are exchanged;
    illustrating the translated ultraviolet mask plate with the linearly polarized ultraviolet light with a dosage that makes the alignment film to orient along a direction perpendicular to the polarization direction of the linearly polarized ultraviolet light and have the highest homogeneity, such that the alignment film has a second orientation direction within the regions corresponding to the ultraviolet transmission regions; and
    the first orientation direction and the second orientation direction are orthogonal to each other in adjacent belt-like regions.

11. The method for implementing the multi-dimensional orientations of the alignment film according to claim 9, wherein when there is one ultraviolet light mask plate, the regions having multi-dimensional orientations of the alignment film are at least two belt-like regions, and the two orientation directions of the alignment film in adjacent belt-like regions are orthogonal to each other, the method comprises:
    providing at least two belt-like regions on the ultraviolet light mask plate with the determined width, and disposing the belt-like regions as ultraviolet absorption regions and ultraviolet transmission regions in an alternate arrangement;
    illuminating the ultraviolet mask plate with the linearly polarized ultraviolet light of the first polarization direction with a dosage that makes the alignment film to orient along a direction parallel or perpendicular to the polarization direction of the linearly polarized ultraviolet light and have the highest homogeneity, such that the alignment film had a third orientation direction within the region corresponding to the ultraviolet transmission regions;

translating the ultraviolet mask plate for the determined width, such that the positions of the ultraviolet absorption regions and the ultraviolet transmission regions are exchanged;

illuminating the translated ultraviolet mask plate with the linearly polarized ultraviolet light of the second polarization direction which is perpendicular to the first polarization direction with the same dosage to obtain a fourth orientation direction; and the third orientation direction and the fourth orientation direction are orthogonal to each other in adjacent belt-like regions.

12. The method for implementing the multi-dimensional orientations of the alignment film according to claim 5, wherein when the alignment film is oriented along the direction perpendicular to the polarization direction of the linearly polarized ultraviolet light and has the highest homogeneity, the dosage of the linearly polarized ultraviolet light is 500±5 mJ/cm$^2$.

13. The method for implementing the multi-dimensional orientations of the alignment film according to claim 5, wherein when the alignment film is oriented along the direction parallel to the polarization direction of the ultraviolet light and has the highest homogeneity, the dosage of the linearly polarized ultraviolet light is 2000±5 mJ/cm$^2$.

* * * * *